(12) United States Patent
Latos et al.

(10) Patent No.: US 7,240,408 B2
(45) Date of Patent: Jul. 10, 2007

(54) SELECTIVITY ALTERING A FIBER HEIGHT IN A PILE FABRIC AND APPARATUS

(75) Inventors: George P. Latos, Trabuco Canyon, CA (US); Wayne K. Shaffer, Penfield, NY (US)

(73) Assignee: Icon Textile Laser Systems, Inc., Vernon, CA (US)

( * ) Notice: Subject to any disclaimer, the term of this patent is extended or adjusted under 35 U.S.C. 154(b) by 459 days.

(21) Appl. No.: 10/757,678

(22) Filed: Jan. 14, 2004

(65) Prior Publication Data

US 2005/0151302 A1 Jul. 14, 2005

(51) Int. Cl.
*D06C 23/00* (2006.01)
*D06C 13/00* (2006.01)

(52) U.S. Cl. .............................. 26/2 R; 26/8 R; 26/16; 28/160

(58) Field of Classification Search .................. 26/2 R, 26/7, 8 R, 9, 13, 16, 30, 69 R, 69 B, 2 E, 26/3, 15 R; 28/159, 163, 165, 160–162, 28/170; 219/121.12, 121.16–121.19, 121.2, 219/121.28, 121.29, 121.35
See application file for complete search history.

(56) References Cited

U.S. PATENT DOCUMENTS

| 3,226,527 | A | * | 12/1965 | Harding | 219/384 |
|---|---|---|---|---|---|
| 4,159,558 | A | * | 7/1979 | Durville et al. | 26/10 R |
| 4,629,858 | A | | 12/1986 | Kyle | |
| 4,680,032 | A | | 7/1987 | Arnott | |
| 4,793,033 | A | | 12/1988 | Schneider et al. | |
| 5,017,423 | A | | 5/1991 | Bossmann et al. | |
| 5,165,151 | A | | 11/1992 | Nakagawa | |
| 5,388,488 | A | | 2/1995 | Geidl et al. | |
| 5,450,333 | A | | 9/1995 | Minami et al. | |
| 5,886,317 | A | | 3/1999 | Hinrichs et al. | |
| 5,979,278 | A | | 11/1999 | Warthen et al. | |
| 5,990,444 | A | * | 11/1999 | Costin | 219/121.69 |
| 6,050,168 | A | | 4/2000 | Kuchta et al. | |
| 6,090,158 | A | * | 7/2000 | McLaughlin | 26/70 |
| 6,119,565 | A | | 9/2000 | L'Heureux | |
| 6,140,602 | A | * | 10/2000 | Costin | 219/121.69 |
| 6,252,196 | B1 | | 6/2001 | Costin et al. | |
| 6,430,787 | B1 | | 8/2002 | Becan et al. | |
| 6,505,388 | B1 | | 1/2003 | Becan et al. | |
| 6,640,680 | B2 | | 11/2003 | Becan et al. | |

* cited by examiner

*Primary Examiner*—A. Vanatta
(74) *Attorney, Agent, or Firm*—Harter Secrest & Emery, LLP; Jodi A. Reynolds, Esq.; Brian B. Shaw, Esq.

(57) ABSTRACT

A region of a pile fabric is impacted with a laser at spaced illuminated areas in a dithered image, wherein the laser energy and duration of impact in the illuminated areas are selected to shorten the fibers within the illuminated area. The spacing of the illuminated areas within the region and the amount of shortening within the illuminated areas are selected to essentially maintain a hand or feel of the pile fabric. Fleece and corduroy can be sculpted to provide a three-dimensional image, while maintaining the hand of the fleece. In dyed pile fabrics, the illuminated areas can be selected to change the dye distribution within the pile material to provide an altered coloration.

12 Claims, 2 Drawing Sheets

SELECTIVITY ALTERING A FIBER HEIGHT IN A PILE FABRIC AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to laser treating pile fabrics and, more particularly, to changing a fiber height in the pile fabric by laser energy, while maintaining a desired feel or hand of the fabric, wherein selected fabrics can exhibit color alteration.

2. Description of Related Art

Materials have commonly been used to make clothing, linens, footwear, belts, purses and wallets, luggage, vehicle interiors, furniture coverings, wall coverings, and many other manufactured goods. Consumer demand for graphics on these materials has increased over the recent years. Consumers often desire graphics on these materials to give the materials a unique and attractive appearance.

The typical methods of forming graphics on materials include dyeing, printing, weaving, embossing, and stamping. Unfortunately, such methods are very costly in terms of capital investment and operating cost. In addition, these prior methods are often unfriendly to the environment.

Lasers have been used in the fabric industry to cut fabrics into separate pieces. Lasers have also been used to fix dyes. However, in the past, certain technical barriers have often prevented the use of lasers to form graphics on certain fabrics.

Therefore, the need exists for a laser treatment of a pile fabric that can preserve the hand (feel) of the fabric, while still imparting a change in fiber length. That is, the need exists for pile fabric that can have a sculpted, three-dimensional appearance, without destroying the traditional soft feel of the pile. Thus, the aesthetic feel or tactile quality of something, such as a fabric, textile, or carpeting, that indicates its fineness, texture, and durability (hand) is substantially preserved, while imparting a variation in the pile height.

BRIEF SUMMARY OF THE INVENTION

The present invention provides a sculpted pile fabric, wherein the hand of the fabric can be at least substantially preserved. The invention includes the method of illuminating a region of the pile fabric at spaced areas within the region in a stochastic pattern, wherein the fibers within the illuminated area are shortened, while the fibers in adjacent non-illuminated areas are not shortened. The resulting pile fabric has a sculpted (three-dimensional) fiber height, with a consistent hand. By varying the spacing of the illuminated areas and the amount of shortening within the illuminated areas, different sculpting can be imparted to the pile fabric.

The sculpting can be selected to impart graphics, text, designs, logos, or patterns in the pile fabric. The illumination of the areas can also be used to impart a change in coloration of dyed fibers.

The invention also provides a pile fabric with a sculpted fiber height, wherein the hand of the pile fabric is maintained. The pile fabric has a plurality of areas within a given region, wherein the fibers within the plurality of areas in a dithered image pattern are shorter than the fibers in the surrounding portion of the region. In one configuration, each illuminated area having a shortened fiber height in the dithered image pattern is surrounded by a portion of the pile fabric having the original pile height.

BRIEF DESCRIPTION OF THE SEVERAL VIEWS OF THE DRAWING(S)

DETAILED DESCRIPTION OF THE INVENTION

Figure 1:
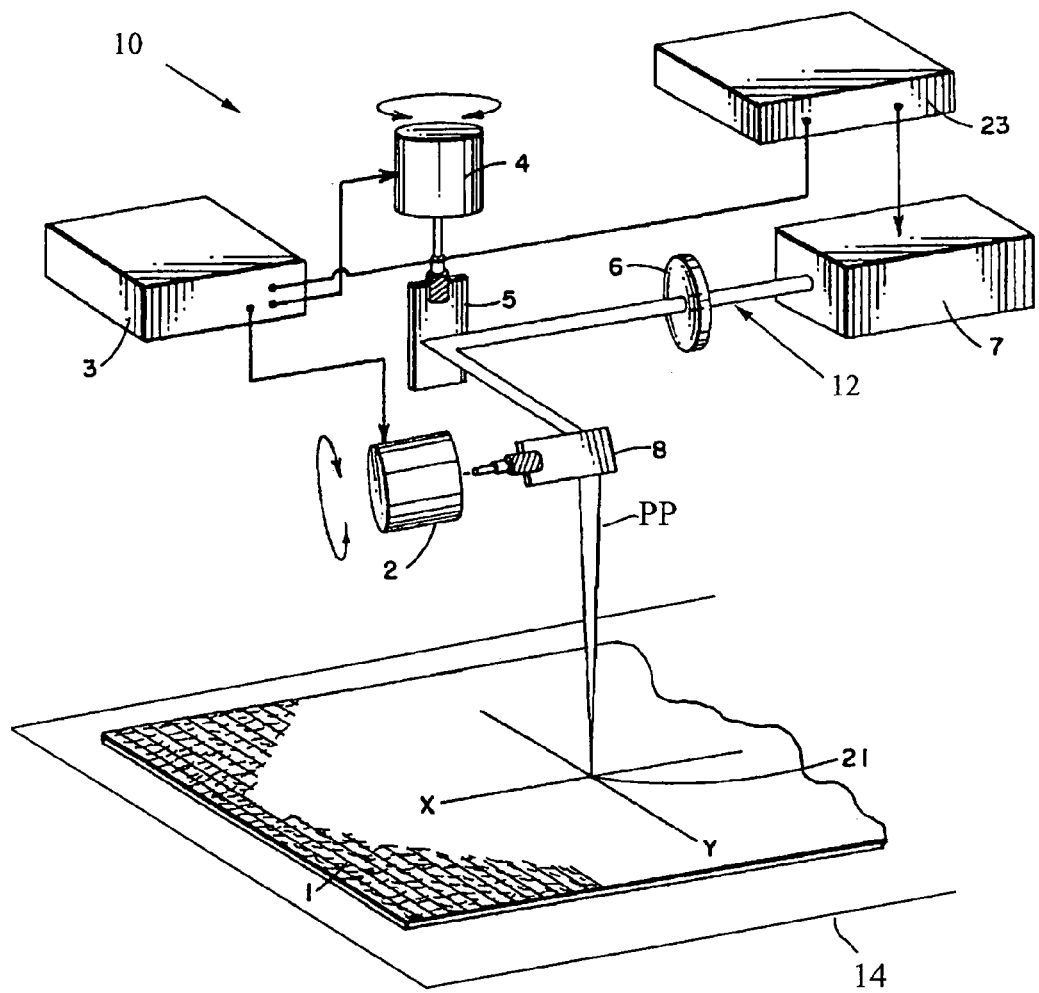
FIG. 1 is a perspective schematic view of a typical configuration of the present invention including a computer controlled laser.
Figure 2:
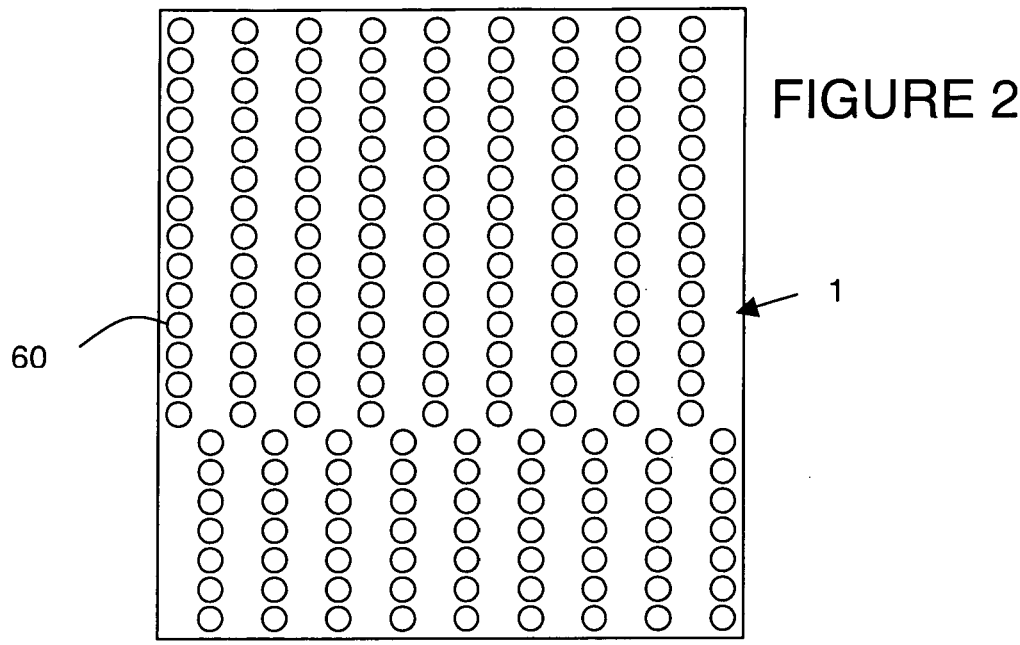
FIG. 2 is a top plan view of a region of a pile fabric showing the illuminated areas.
Figure 3:
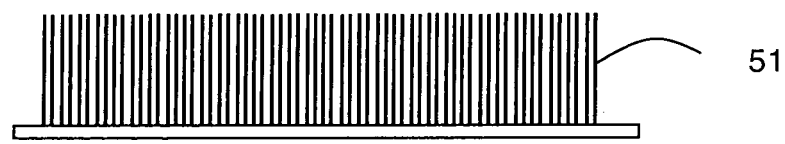
FIG. 3 is a representative cross-sectional view of a pile fabric.
Figure 4:
FIG. 4 is a side-elevational view showing the fiber shortening within an illuminated area and the original fiber height in an adjacent portion of the pile fabric.

The laser scanning system 10 projects a laser beam 12 along a projection path PP to intersect the pile fabric 1 being processed as the pile fabric is disposed upon a pallet 14.

The laser scanning system 10 finds particular application in treating pile fabrics 1. For purposes of description, the term "pile fabric" encompasses textiles and materials made from fibers or threads by weaving, knitting, felting, or other interconnecting processes. The fabric is preferably napped or pile, having a multitude of projecting fibers 51. In the napped fabric, the fibers are typically raised by brushing the fabric to locate the fibers projecting from the fabric, wherein the fibers can be in a loop configuration or have a terminal free end. In the pile configuration, the raised surface is typically produced by fiber loops on the body or substrate of the fabric, wherein the loops are sheared or cut. For purposes of description, the term "pile" includes projecting fibers formed by shearing or napping, including fleece as well as flocking and corduroy.

Thus, the pile (or fleece) fabric 1 will have an average or typical fiber height measured from a base or substrate of the fabric. The measurement of the length of fibers in the pile is often referred to as a height or depth of the pile. Typical fiber height is approximately 0.5 mm to approximately 1 cm. In the present description, the fibers 51 are set forth as having an original (pre-laser treating) height, wherein the fibers are shortened in the present invention. The shortening of the fiber height means the fibers project from the substrate by less than the original distance. The number of fibers per inch can range from approximately 25 fibers per inch to approximately 1000 fibers per inch. Thus, per square inch of the pile fabric 1, there can be from approximately 25 to approximately 1,000,000 fibers 51.

The laser scanning system 10 typically includes at least one scanning mirror, wherein laser parameters, such as output power and repetition rate, are set by a laser controller 23 and a central processing unit (CPU) 3. The parameters for the desired pattern to be made on the pile fabric 1 are typically programmed into the CPU 3. The beam position and laser intensity can be rapidly modulated to produce the desired 3D effects in the pile, including but not limited to graphics and text effects.

The CPU 3 has graphic information and formatting instructions to drive the galvanometric or scanning mirrors and control the laser parameters to produce the desired pattern on the pile fabric 1. As per the command sequence, a modulated or continuous laser beam originates from a laser oscillator 7. The laser oscillator 7 can be a $CO_2$ laser, Nd:YAG laser, harmonics of an Nd:YAG laser, fiber laser, laser diode, or other laser source, q-switched with an acousto-optic or electro-optic modulator.

A Nd:YAG laser with a wavelength of approximately 1064 nanometers and a $CO_2$ laser with a wavelength of approximately 10600 nm can be employed. The laser beam 12 can be generated by a frequency doubled or tripled Nd:YAG laser having a wavelength of approximately 532 nm or 354 nm, respectively.

Other possible wavelengths for other laser sources range between 190 nanometers to 10600 nanometers. An excimer laser can operate effectively at wavelengths 196 nm to 308 nm, or a $CO_2$ laser can operate effectively at around 10600 nanometers. The wavelength of the laser can be chosen such that it is strongly absorbed by the pile fabric. The range of pulse duration used has been from 5 nanoseconds to 1000 milliseconds, with the best results being from 20 microseconds to 50 milliseconds.

Other variables, such as the pulse energy, peak power, scan speed, dot (illuminated area) pitch, and energy density play an important factor in the degree of fiber shortening. The power of the laser 7 can range from approximately 100 watts to approximately 5000 watts. Lasers having a power between approximately 200 watts to approximately 500 watts have been found satisfactory.

For example, these variable parameters can include the laser beam having a repetition rate from 1 hertz to 500 MHz ($500 \times 10^6$ hertz), a pulse duration between approximately 10 fs ($10 \times 10^{-15}$ seconds) to 500 ms ($500 \times 10^{-3}$ seconds). In addition, ranges from 5 nanoseconds to continuous are possible, in that the laser can have a continuous output beam and is classified as a CW laser, or the laser can have a scan speed of 1 mm per minute to 500 meters/second, and a dot (illuminated area) 60 size between approximately 25 microns to 1000 microns. A preferred illuminated area is approximately 500 microns, +/−50 microns.

The number of illuminated areas 60 per inch can range from approximately 1000 areas per inch to approximately 25 areas per inch.

A preferred range for the duration of the pulses is from 20 microseconds to approximately 1 millisecond.

It is understood that alternative constructions can be employed. A laser of any type, including but not limited to a gas laser and a solid-state laser in CW or pulsed operation mode, produces a laser beam. A $CO_2$ laser can be preferred for processing many materials.

The laser beam 12 can follow an optical system that directs the beam onto an x-axis mirror 5 controlled by an x-axis galvanometer 4 and a y-axis mirror 8 controlled by a y-axis galvanometer 2. The beam 12 is reflected from the x-axis mirror 5, which controls beam movement in the x-axis, onto the y-axis mirror 8, which controls beam movements in the y-axis. Preferably, the laser beam 12 impinges the pile fabric 1 on the pallet 14 along a scanning pattern. The scanning pattern, or trace, can be created by any of a variety of scanning mechanisms. The particular scanning pattern, or trace, can be any of a variety of patterns including raster or vector.

The laser beam 12 can propagate through a focusing lens or beam forming optical system 6 and onto the pile fabric. The focusing lens 6 can be located before and/or after the x and y scanning mirrors 5,8. As the x-axis and y-axis mirrors 5,8 are moved, the focused laser beam 12 moves across the pile fabric 1 as directed by the CPU 3. The focusing lens 6 causes the laser beam 12 passing through the lens to focus to a focal point along the optical axis. Preferably, the focusing lens 6 is selected to locate the focal point adjacent the pile fabric 1 or the pallet 14. However, it is understood the focal point can be moved along the optical path to selectively control the energy input to the pile fabric 1 and hence the amount of 3D sculpting.

A movable stage can be used to hold the lens 6 so that the distance between the lens and the pallet 14 can be changed to alter the beam spot size as well as the focal point along the projection path PP. Alternatively, the pallet 14 can be moved relative to the lens 6.

Usually, the laser beam 12 is directed generally perpendicular to the surface of the pallet, but it can be desirable to guide the beam to the surface with an angle to achieve certain effects. For example, the incident angle can range between about 0° and about 45° from a perpendicular to the local plane of the pile fabric.

The present invention provides a method for the image processing and laser processing of pile fabrics 1, including deep textile materials. In this method, commercially available software is used to convert grayscale images from true color to stochastic images. The stochastic process transforms a true color image to a series of uniformly sized dots that correspond to the grayscales present in the true color image. Some typical stochastic processes are incorporated in off-the-shelf image processing software programs and are referred to as image dithering. Image dithering algorithms, which work in this invention, are listed as follows: Floyd-Stienberg, diffusion dither, connect-the-dots, Burks, Bayer, Stucki, Sierra, Stevenson Arce, Jarvis, clustered dot, dispersed dot, and ordered dither. It is understood that other spatial dithering techniques can be employed.

The laser 7 is scanned across the deep pile fabric 1 to illuminate a plurality of spaced areas (dots) 60 within a given region of the fabric. Each laser dot (illuminated area) 60 affects one or more fibers within the illuminated area, depending upon the number of fibers 51 within the illuminated area. The dot density of the dithered image is directly related to the depth of the image in the pile of the fabric. High dot density corresponds with deeper image depth in the pile; and, conversely, low dot density corresponds with shallow image depth in the pile. The unaffected fibers 51 in the pile stand higher than adjacent selectively truncated fibers. It is these unaffected fibers that preserve the hand of the fabric. In the highest dot density condition, effectively all of the fibers that comprise the pile are shortened and the hand of the fabric is lost.

Representative illuminated areas 60 for a given region (surface area) of the pile fabric 1 is between approximately 1% and approximately 75%. That is, for a given area of the pile fabric 1, wherein the fiber height is to be reduced by at least approximately 75%, less than approximately 75% of the given region is illuminated. The space between adjacent illuminated areas 60 is typically between 25 microns and 1000 microns, with a preferred spacing of approximately 200 microns to approximately 700 microns.

In one configuration, it has been found beneficial to reduce the fiber height by at least 80% of the original height within each illuminated area, wherein the illuminated areas 60 represent approximately 50% of a region of the pile fabric. By thus controlling the spacing of the illuminated areas 60, the hand of the pile fabric 1 is maintained. In a further configuration, the fiber height is reduced by at least 90% within the illuminated area, wherein approximately 500 illuminated areas are formed per inch of the pile fabric. In a further configuration, the fibers 51 are at least substantially removed within each illuminated area. That is, no meaningful fiber height remains after illumination with the laser.

Preferably, at least 25% of the area within each given square inch of the pile fabric 1 is maintained at the original fiber height to preserve the hand of the fabric. It is understood that substantially all of the fibers 51 in a region can be shortened. However, such wide spread shortening of the fibers 51 tends to undesirably reduce the soft feel of the pile fabric.

Selective truncation, or shortening of the fibers 51 without adversely affecting the hand, is achieved by using the stochastic or image dithering techniques, wherein the scanning laser beam 12 is driven accordingly. This type of image dithering transforms a grayscale image to a dot density rather than dot size or continuous tone. The stochastic transformation of image data is driven by the natural color or grayscale deviation in the image being replicated. Light areas in the image are reproduced on the fabric 1 with a relatively low number of laser pulses per unit area; and, conversely, dark areas in the image are reproduced on the fabric with a relatively high number of laser pulses per unit area.

Each laser dot (illuminated area) 60 shortens one or more fibers 51 in the pile in the illuminated area in accordance with the selected and controlled laser energy per pulse. By controlling the illuminating parameters such as pulse duration, energy of the laser, and spot size, the amount of fiber shortening can be controlled. The amount of 3-D sculpting is determined by the extent of shortening of the fibers of the pile within an illuminated area. Thus, different illuminated areas 60 can have different degrees of shortening and hence different resulting fiber heights.

While all, or substantially all, the fibers 51 within a given illuminated area (spot) 60 are shortened, the amount of shortening can be controlled for different illuminated spots. Typically, the illuminated areas for a given pile fabric are selected to be equal in area, duration, and intensity. However, it is understood that the illuminated areas for a given region of the pile fabric can have different sizes, durations, and intensities. In one configuration, the area of illumination, duration, and laser power are constant for each area of illumination. Thus, the fibers 51 within each illuminated area 60 are reduced by substantially the same amount, while the density of illuminated areas per given area is controllably varied.

The spacing of the illuminated areas, the size of the illuminated areas, and the amount of shortening of the fibers within a given illuminated area are selected to maintain a desired degree of hand or feel of the pile fabric. That is, a change (a macroscopic level) in the fiber height is visually perceptible by the user, yet a sufficient number of non-illuminated areas remain amongst the illuminated areas to provide a desirable feel or hand of the pile fabric.

Maintaining the hand of the pile fabric (fleece) has been found particularly desirable when texturing or sculpting pile fabrics including fleece and napped fabrics like corduroys. When treating the corduroys, the height of the wales in the corduroy is reduced at spaced areas. In one configuration, the spaced areas are in a stochastic pattern, wherein the wale height has been reduced in the illuminated pattern.

Further, the illuminating parameters (and illuminated area size) are selected to limit melting of meltable fibers below a threshold, which would form lumps of the material upon cooling.

It has been found for synthetic materials such as polyester, rayon, acetate, Lycra® synthetic fibers sold by E.I. du Pont de Nemours and Company, nylon, and urethane that illumination of the fibers can shorten the fibers through a melting of the fibers. As the laser energy impinges from above the pile fabric, the melted material tends to flow down to the base of the fabric, without bonding to adjacent fabrics. This assists in preserving the hand of the fabric 1.

In contrast, for natural fibers such as wool or cotton, it has been found that sufficient energy in the illumination of these fibers will result in a burning or ablation of the material. The illuminating parameters can be selected to essentially preclude discoloration of the natural fiber. Alternatively, if discoloration is desired, the illuminating parameters can be selected to controllably discolor the natural fibers.

Another aspect to the present invention includes the color enhancement of dyed synthetic fabrics. As laser energy is absorbed on dyed synthetic materials, the synthetic material melts. The melted material flows and causes a relocation of the dye molecules within the synthetic material, thereby causing color enhancement. The color enhancement is believed to result from the light reflection from dye particles encapsulated by translucent or clear base material (thus giving a wetting or wetted appearance). The re-melting of the base synthetic material changes the morphology of the dye particle, making its reflection more specular. The dye particles are believed to be distributed near the surface of the re-melted synthetic base material. It is further believed that some dyes change color or change hue when heated. This inherent dye change can also contribute to the resulting color change (enhancement).

The present invention has found particular use with synthetic fabrics such as polyester, which encompasses a family of materials including: fleece, corduroy, spandex (such as Lycra® synthetic fibers sold by E.I. du Pont de Nemours and Company), and micro-fiber fabrics. Some of the fabrics in this class exhibit a color enhancement effect along with 3D laser sculpting. Natural fibers can exhibit color fading along with 3D laser sculpting. Specifically, dyed polyester fibers have been found to exhibit the color enhancement (alteration) upon thermal treatment from the laser.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

The invention claimed is:

1. A method of forming a stochastic image pattern in a given region of pile fabric having a multitude of projecting fibers of a given length, the method comprising:
    (a) illuminating the pile fabric at spaced areas in the stochastic image pattern to shorten the fibers within the area of illumination, wherein the height reduction of the fibers within each of the illuminated areas corresponds to a dot density of a stochastic image; and (b) maintaining the given length of fibers adjacent the illuminated area, wherein the given length of at least 25% of the fibers in the given region of pile fabric within the stochastic image pattern is maintained.

2. The method of claim 1, further comprising providing the spaced areas at a distance selected to maintain a hand of the pile fabric.

3. The method of claim 1, further comprising shortening substantially all the fibers within an illuminated area.

4. The method of claim 1, further comprising illuminating the spaced areas by a circular pattern.

5. The method of claim 1, further comprising illuminating at least 25 areas per inch.

6. The method of claim 1, further comprising substantially eliminating the fibers within an illuminated area.

7. The method of claim 1, wherein illuminating the pile fabric includes illuminating one of a polyester fiber, a napped fiber, a flocked fiber, a fleece fiber, or a corduroy wale.

8. A method of imparting a contour to a given region of a pile fabric, the pile fabric having a multitude of projecting fibers of an original height, the method comprising:
  (a) illuminating the given region at a plurality of spaced illuminating areas in a dithered image with a laser to shorten the fibers within the illuminated areas, wherein each illuminated area is spaced from an adjacent illuminated area by less than 1000 microns, and wherein the height reduction of the fibers within each of the illuminated areas corresponds to a dot density of a stochastic image; and
  (b) maintaining original fiber height in a non-illuminated area.

9. The method of claim 8, further comprising selecting an energy density within the illuminated area to melt a length of the fibers within the illuminated area.

10. The method of claim 8, further comprising selecting an energy density, illumination area and duration to shorten the fibers within the illuminated area.

11. The method of claim 8, further comprising substantially removing the fibers within the illuminated area.

12. A method of laser treating of a fleece, comprising:
  (a) illuminating spaced areas in a stochastic image pattern to reduce a fiber height within the illuminated area, wherein the reduced fiber height within each of the illuminated areas corresponds to a dot density of a stochastic image; and
  (b) spacing the illuminated area a sufficient distance to preserve the hand of the fleece.

* * * * *